US011200473B2

(12) United States Patent
Sato

(10) Patent No.: US 11,200,473 B2
(45) Date of Patent: Dec. 14, 2021

(54) INFORMATION PROCESSING DEVICE TO DETERMINE WHETHER A MANAGED DEVICE IS A MOBILE DEVICE OR A STATIONARY DEVICE, INFORMATION PROCESSING METHOD, AND NON-TRANSITORY COMPUTER-READABLE RECORDING MEDIUM THEREFOR

(71) Applicant: BROTHER KOGYO KABUSHIKI KAISHA, Nagoya (JP)

(72) Inventor: Yutaro Sato, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/195,821

(22) Filed: Mar. 9, 2021

(65) Prior Publication Data
US 2021/0303954 A1 Sep. 30, 2021

(30) Foreign Application Priority Data

Mar. 31, 2020 (JP) .............................. JP2020-062330

(51) Int. Cl.
*G06K 15/00* (2006.01)
*G06F 3/12* (2006.01)

(52) U.S. Cl.
CPC ......... *G06K 15/4075* (2013.01); *G06F 3/121* (2013.01); *G06F 3/1203* (2013.01); *G06F 3/1224* (2013.01); *G06F 3/1229* (2013.01); *G06K 15/002* (2013.01)

(58) Field of Classification Search
None
See application file for complete search history.

(56) References Cited

U.S. PATENT DOCUMENTS

| 8,792,793 | B2* | 7/2014 | Kawai | ................. G03G 15/556 399/8 |
| 2018/0103159 | A1* | 4/2018 | Imai | ................... H04N 1/00222 |
| 2021/0232878 | A1* | 7/2021 | Takaoka | ............ G06K 15/4075 |

FOREIGN PATENT DOCUMENTS

JP 2000-181641 A 6/2000

* cited by examiner

*Primary Examiner* — Miya J Williams
(74) *Attorney, Agent, or Firm* — Scully, Scott, Murphy & Presser, PC

(57) ABSTRACT

An information processing device according to aspects of the present disclosures configured to determine whether a managed device is a mobile device or a stationary device. When it is determined that the managed device is the mobile device, a first threshold value is set as a threshold value, and when it is determined that the managed device is the stationary device, a second threshold value is set as the threshold value. When it is determined that the remaining amount of the consumable is equal to or less than the threshold value, the information processing device issues a notification regarding the remaining amount of the consumable associated with the managed device. The notification is issued earlier in a case where the threshold value is the first threshold value than in a case where the threshold value the second threshold value.

18 Claims, 9 Drawing Sheets

| DATE | DEVICE IDENTIFIER | REMAINING AMOUNT OF CONSUMABLE |
|---|---|---|
| 2020/02/19 | aaaaaaaaa | 80 |
| 2020/02/20 | aaaaaaaaa | 63 |
| 2020/02/21 | aaaaaaaaa | 40 |
| 2020/02/21 | bbbbbbbbb | 70 |

FIG. 3

| | Device Status | Model Name | Toner/Ink Volume | Node Name | IP Address | Serial Number | ... | Consumable Replacement Threshold (%) |
|---|---|---|---|---|---|---|---|---|
| ☐ | Sleep | B M-J6999 | | aaaaaaaa | 192.168.1.10 | XXXXX1 | | 20 |
| ☐ | No Errors. | B R-425 | | bbbbbbbb | 192.168.1.11 | XXXXX2 | | 30 |
| ☐ | Sleep | B M-J6535 | | cccccccc | 192.168.1.12 | XXXXX3 | | 20 |
| | ...... | ...... | ...... | ...... | ...... | ...... | | ...... |

FIG. 5

| Application setting | 521 |
|---|---|
| General | Profiles: |
| Device discovery | |
| Network | Specified period: |
| Email server | Network: |
| Security | 5 ◆▶ Minutes |
| Device log | USB: |
| | 60 ◆▶ Minutes |
| Device notification | Threshold: |
| Device list — 523 | ○ Auto |
| Information — 525 | Days required for delivery |
| | 3 ◆▶ Days |
| Back up/Restore — 527 | ⦿ manual |
| | mobile: |
| | 529 — 30 ◆▶ % |
| Solution | stationary: |
| | 531 — 20 ◆▶ % |

OK    Cancel

INFORMATION PROCESSING DEVICE TO DETERMINE WHETHER A MANAGED DEVICE IS A MOBILE DEVICE OR A STATIONARY DEVICE, INFORMATION PROCESSING METHOD, AND NON-TRANSITORY COMPUTER-READABLE RECORDING MEDIUM THEREFOR

CROSS-REFERENCE TO RELATED APPLICATIONS

This application claims priority under 35 U.S.C. § 119 from Japanese Patent Application No. 2020-062330 filed on Mar. 31, 2020. The entire subject matter of the application is incorporated herein by reference.

BACKGROUND

Technical Field

The present disclosures relate to an information processing device, an information processing method and a non-transitory computer-readable recording medium storing computer-executable instructions realizing a management program for the information processing device.

Related Art

In a field of an information processing device capable of communicating with a plurality of printers via a network, there has been proposed a technique to display a list of a plurality of pieces of information regarding the plurality of printers. In such a conventional technique, options (e.g., whether or not a sorter is provided, whether or not a stapler is provided, and whether or not a duplex printing function can be performed) are listed for each printer.

SUMMARY

However, according to the above-mentioned conventional technique, only the presence or absence of the stapler is displayed as described above. Therefore, a user cannot know, for example, whether the remaining amount of the stapler is sufficient.

In view of such a background, it is necessary to consider a configuration in which the consumables of the managed device, which can be communicated via a network, are managed by the information processing device, and the user is notified of any problem regarding the remaining amount of the consumables.

When the managed devices to be managed include a mobile type device and a stationary type device, there arises a difference in the difficulty of obtaining consumables for those devices. Specifically, in the case of the stationary device, spare consumables are likely to be available at a nearby location. Accordingly, if there is a notification indicating a problem with the remaining amount of consumables, the consumables can be replenished or replaced immediately. On the other hand, in the case of the mobile device, if the user takes the device outside, it is difficult for the user to obtain spare consumables when the consumables are used up.

When there is a problem with the remaining amount of consumables, it is preferable that a notification is sent to the user at an early stage to prevent the problem as described above in the mobile devices. If the notification is received at an early stage, the user of the mobile device can take countermeasures, such as going out with spare consumables. However, for the user of the stationary device, it is annoying to be notified too early since they can replenish or replace the consumables at any time. As above, according to the conventional art, it is extremely difficult to adjust the timing of notifications in a way that problems with mobile device are suppressed, while the notifications are less annoying for the user of the stationary device.

According to aspects of the present disclosures, there is provided an non-transitory computer-readable recording medium for an information processing device of an information processing system. The information processing system includes the information processing device and at least one managed device managed by the information processing device The information processing device includes a processor, a display and a communication interface. The managed device includes at least one type of consumables configured to be replaced or replenished. The information processing device is communicable with the managed device through the communication interface. The recording medium storing computer-executable instructions comprises a management program which causes, when executed by the processor, the information processing device to perform managing the consumables. The managing includes determining whether the managed device is a mobile device or a stationary device, setting a first threshold value as a threshold value when it is determined that the managed device is the mobile device, and a second threshold value different from the first threshold value as the threshold value when it is determined that the managed device is the stationary device, obtaining remaining amount information regarding a remaining amount of the consumable currently used in the managed device from the managed device through the communication interface, determining whether the remaining amount of the consumable identified based on the remaining amount information is equal to or less than the threshold value, and issuing a notification regarding the remaining amount of the consumable associated with the managed device when it is determined that the remaining amount of the consumable is equal to or less than the threshold value. The notification is issued earlier in a case where the threshold value is the first threshold value than in a case where the threshold value the second threshold value.

According to aspects of the present disclosures, there is provided an information processing device of an information processing system. The information processing system includes the information processing device and at least one managed device managed by the information processing device. The information processing device includes a processor, a display and a communication interface. The managed device includes at least one type of consumables configured to be replaced or replenished. The information processing device being communicable with the managed device through the communication interface. The information processing device is configured to perform managing the consumables. The processor being configured to perform determining whether the managed device is a mobile device or a stationary device, setting a first threshold value as a threshold value when it is determined that the managed device is the mobile device, and a second threshold value different from the first threshold value as the threshold value when it is determined that the managed device is the stationary device, obtaining remaining amount information regarding a remaining amount of the consumable currently used in the managed device from the managed device through the communication interface, determining whether the remaining amount of the consumable identified based on the remaining amount information is equal to or less than the threshold value, and issuing a notification regarding the remaining amount of the consumable associated with the managed device when it is determined that the remaining amount of the consumable is equal to or less than the threshold value. The notification is issued earlier in a case where the threshold value is the first threshold value than in a case where the threshold value the second threshold value.

An information processing method for an information processing device of an information processing system. The information processing system includes the information processing device and at least one managed device managed by the information processing device. The information processing device includes a display and a communication interface. The managed device includes at least one type of consumables configured to be replaced or replenished. The information processing device is communicable with the managed device through the communication interface. The information processing device is configured to perform managing the consumables. The method including determining whether the managed device is a mobile device or a stationary device, setting a first threshold value as a threshold value when it is determined that the managed device is the mobile device, and a second threshold value different from the first threshold value as the threshold value when it is determined that the managed device is the stationary device, obtaining remaining amount information regarding a remaining amount of the consumable currently used in the managed device from the managed device through the communication interface, determining whether the remaining amount of the consumable identified based on the remaining amount information is equal to or less than the threshold value, and issuing a notification regarding the remaining amount of the consumable associated with the managed device when it is determined that the remaining amount of the consumable is equal to or less than the threshold value. The notification is issued earlier in a case where the threshold value is the first threshold value than in a case where the threshold value the second threshold value.

BRIEF DESCRIPTION OF THE DRAWINGS

FIG. 3 shows an example of a management screen.

FIG. 5 shows an example of a setting dialog.

DETAILED DESCRIPTION OF THE EMBODIMENT

Hereinafter, an information processing device, an information processing method, and a non-transitory computer-readable recording medium containing instructions realizing a management program will be described with reference to an illustrative embodiment.

Configuration of Information Processing System

Figures 1, 2:
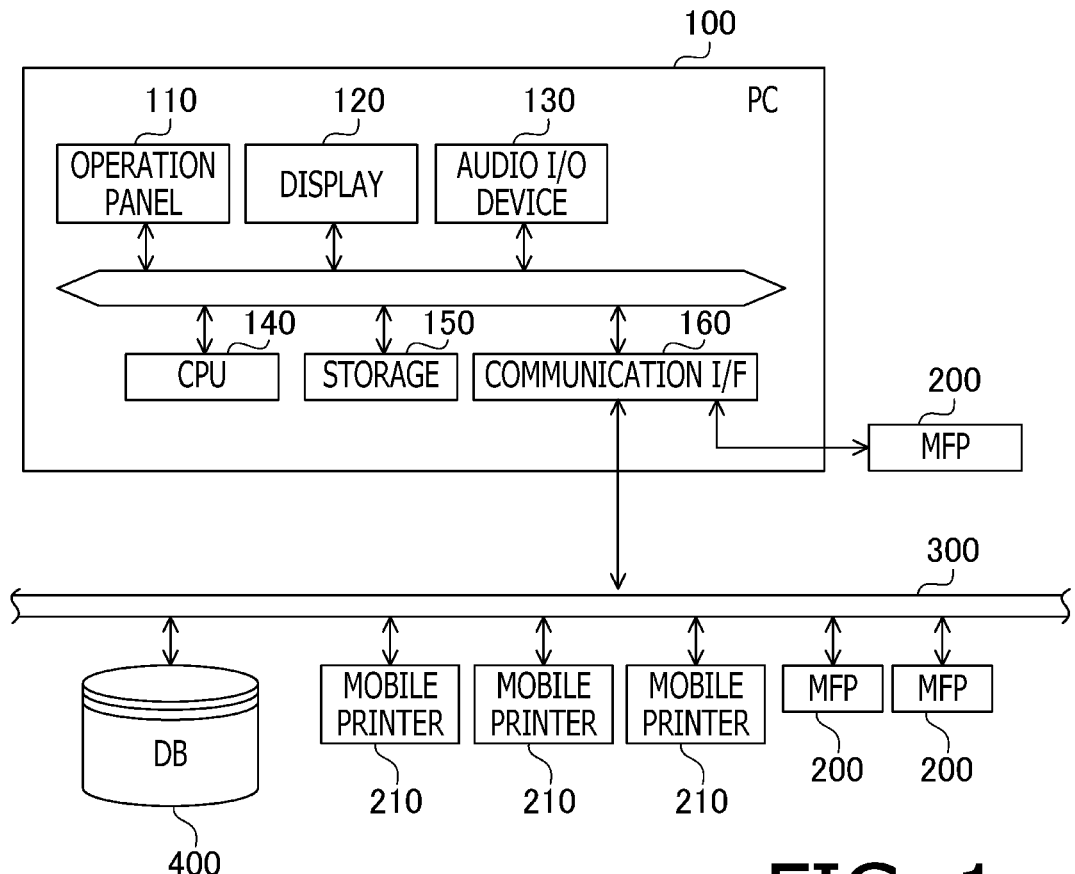
FIG. 1 shows a configuration of an information processing system according to the present disclosures.
FIG. 2 shows an example of a remaining amount information log.

FIG. 1 shows a configuration of an information processing system 1 that includes a personal computer (PC) 100, a multifunction peripheral (MFP) 200, and a mobile printer 210. The PC 100 is configured to execute processes based on a management program according to one embodiment of the present disclosures (hereinafter, the PC 100 will also be referred to as a management device). The MFP 200 and the mobile printer 210 are communicatively connected to the PC 100. The MFP 200 and the mobile printer 210 are devices managed by the PC 100 which serves as the management device (hereinafter, such a device managed by the management device will also be referred to as a managed device).

The PC 100 has an operation panel 110, a display 120, an audio I/O device 130, a CPU 140, a storage 150, and a communication I/F 160. It is noted that "I/O" is an abbreviation for Input/Output, "CPU" is an abbreviation for Central Processing Unit, and "I/F" is an abbreviation for an interface.

The operation panel 110 typically includes a keyboard and a mouse. The display 120 includes a display such as a liquid crystal display or an organic EL display, and a drive circuit to drive the display. As the display 120, a display configured to allow input using a touch panel system may be used. In such a case, the user can perform input operations by pressing (touching) the input buttons displayed on the screen. In this case, a transparent touch panel superimposed on the screen of the display functions as the operation panel 110.

The audio I/O device 130 includes a microphone, a speaker, and audio processing circuits. The CPU 140 is configured to execute various application programs (hereinafter abbreviated as "App"), including the management program and firmware according to the present embodiment.

The storage 150 includes a ROM (Read Only Memory), a RAM (Random Access Memory), an HDD (Hard Disk Drive), an SSD (Solid State Drive), an optical disk drive, and the like. The ROM stores the firmware and various data. The RAM is used as a primary storage device where applications and data are temporarily stored when the CPU 140 executes various processes.

The storage 150 stores an OS (Operating System), the management program according to the present embodiment, and various other applications and data. The various applications can be downloaded from an external server (not shown) via the communication I/F 160. The applications can also be downloaded from the external device (not shown) via a USB (Universal Serial Bus) I/F provided to the PC 100.

The management program according to the present embodiment is an application configured to display and manage the status of functions (e.g., a printer function, a scanner function, and a facsimile function, etc.) provided by the MFP 200 and the mobile printer 210 per each device.

The communication I/F 160 is a device having a function to connect the PC 100 to a communication network 300 and a function to connect external devices to the PC 100. Since the communication network 300 is assumed to be a wired or wireless LAN (Local Area Network) in this embodiment, the communication I/F 160 has a LAN I/F (Local Area Network Interface) or WLAN I/F (Wireless LAN Interface). It should be noted that both the wired LAN and the wireless LAN could exist simultaneously, and in such a case, the communication I/F 160 includes both the LAN I/F and the WLAN I/F. The communication network 300 is not limited to the LAN, but may be of any other network type such as the Internet. The interface for directly connecting the external devices to the PC 100 includes the USB I/F and the Bluetooth® I/F. The multiple MFPs 200 and the mobile printers 210 can be connected to the communication network 300 in this embodiment.

The PC 100 is configured to access the database (DB) 400. The DB 400 is a data storage area accessible via the communication network 300. The DB 400 is configured, for example, by a NAS (Network Attached Storage). The information registered in the DB 400 can be retrieved by various devices that can access the DB 400 via the communication network 300.

The DB 400 stores a remaining amount information log as shown in FIG. 2. In the remaining amount information log, information indicating the remaining amount of the consumables in the managed device is stored for each managed device on a daily basis. The remaining amount information log is used in the process described below.

Overview of Management Process

Next, an overview of a management process performed in the PC 100 will be described. When the management process is performed in the PC 100, the PC 100 obtains remaining amount information regarding a remaining amount of consumables used in each managed device from the managed devices (e.g., the MFP 200 and the mobile printer 210) which are under the management of the PC 100. The remaining amount information is obtained from the managed devices through the communication IF 160. The PC 100 determines whether or not the remaining amount of the consumables identified based on the remaining amount information is less than or equal to a consumable replacement threshold. When it is determined that the remaining amount is less than or equal to the consumable replacement threshold, the PC 100 performs a notifying process of notifying the remaining amount of the consumables to a user. When receiving the notification, the user or an administrator knows that the remaining amount of the consumables is less than or equal to the consumable replacement threshold in the managed device subjected to the notification, and can take measures such as preparing spare consumables for replenishment or replacement.

As a characteristic configuration according to the present embodiment, the above management process determines whether the managed device is a mobile type device or a stationary type device, and sets different consumable replacement thresholds for the mobile type device and the stationary type device. For example, when the managed device is the mobile printer 210, which is an example of a mobile device, a first threshold value is set as the consumable replacement threshold, while when the managed device is an MFP 200, which is an example of the stationary device, a second threshold value is set as the consumable replacement threshold. If the managed device is MFP 200 (i.e., stationary device), the second threshold is set as the consumable replacement threshold. In addition, the first threshold value is set so that the notifying process is executed earlier than when the second threshold value is set.

With this configuration, when the managed device is the mobile printer 210, the notification is made earlier than when the managed device is the MFP 200. Therefore, since the user of the mobile printer 210 will be notified earlier than the user of the MFP 200, the user can prepare spare consumables with a margin (e.g., in good time). Therefore, by the time the consumables actually run out, the user of the mobile printer 210 can go to a destination with the spare consumables that have already been prepared.

On the other hand, in the case of the MFP 200, it is sufficient that the spare consumables for replacement have been prepared in advance. Since the MFP 200 is the stationary device, it is unlikely that the MFP 200 is taken out alone to a different location than where the spare consumables are located. The user of the MFP 200 can replenish or replace the consumables at any time, and does not need to be notified as early as the user of the mobile printer 210. Rather, it may be troublesome if the notification arrives excessively early. In this regard, in the above management process, the users of the MFP 200 are notified later than the users of mobile printer 210. Accordingly, the users of MFP 200 are not bothered by the earlier notification.

Management Screen

When the management process is executed on the PC 100, a management screen 501 shown in FIG. 3 is displayed on the display 120 of the PC 100.

On the management screen 501, a plurality of display objects including an information table 503 are arranged. The information table 503 includes a plurality of display fields, and the plurality of display fields are arranged so as to have the same number of lines as the plurality of managed devices and the same number of rows as a plurality of display items regarding the managed devices. FIG. 3 shows, as examples of the display items, "Device status," "Model name," "Toner/Ink volume," "Node name," "IP address," "Serial number," and "Consumable replacement threshold (%)." It is noted that other items may be displayed optionally or alternatively in the information table 503.

Among these items, numerical values displayed in the "Consumable replacement threshold (%)" row is the consumable replacement threshold values set for respective managed devices (which is an example of a threshold object). As shown in FIG. 3, in the case of the mobile printer 210, 30% (i.e., the first threshold.) is set as the consumable replacement threshold. FIG. 3 shows an example in which 30% (which is an example of the first threshold value) is set as the consumable replacement threshold in the case of mobile printer 210, and 20% (which is an example of the second threshold value) is set as the consumable replacement threshold in the case of MFP 200. In this way, the consumable replacement thresholds set for respective managed devices are displayed on the management screen 501, so that the user viewing the management screen 501 can easily grasp the consumable replacement thresholds set for respective managed devices.

Figure 4:
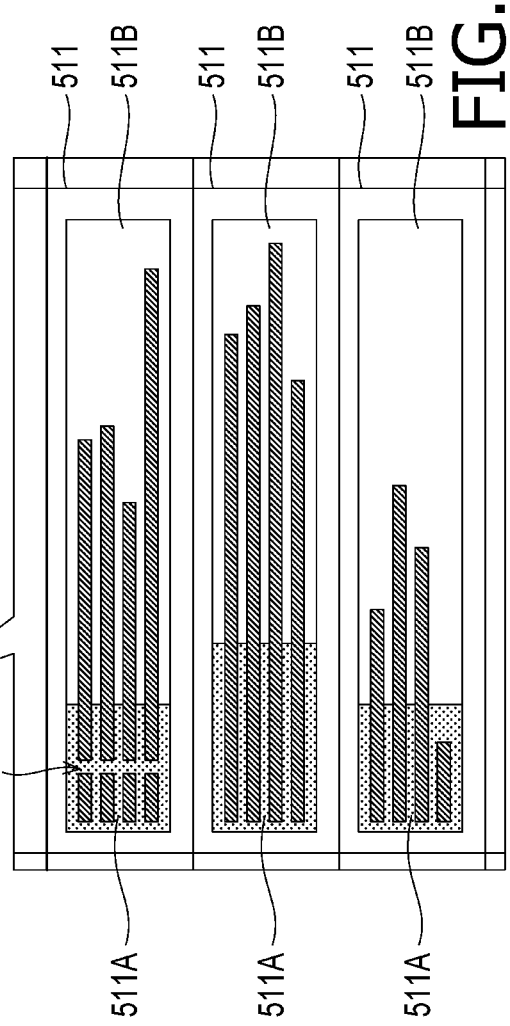
FIG. 4A shows another example of a management screen.
FIG. 4B shows an enlarged partial view of the management screen shown in FIG. 4A.

FIGS. 4A and 4B show another display example different from FIG. 3. In the example shown in FIG. 4A, the "Toner/Ink volume" fields are used as display fields for the consumable replacement thresholds. In the "Toner/Ink volume" field corresponding to each managed device, four bar graphs (which is an example of a remaining amount object according to the present disclosures) are displayed. The four bar graphs correspond to cyan (C), magenta (M), yellow (Y), and black (K) colors, respectively. For the sake of illustration, the four bars are represented by monochromatic images in FIG. 4, but are actually displayed as color images corresponding to each of the above colors on the display 120.

A graph display field 511 where the four bar graphs are displayed is divided into two areas with different background colors. The two areas are a first area 511A and a second area 511B. The boundary between the first area 511A and the second area 511B indicates the consumable replacement threshold. Specifically, among the three graph display fields 511 shown enlarged in FIG. 4B, an upper graph display field 511 corresponds to the MFP 200. In this case, since 20% is set as the consumable replacement threshold, the width of the first area 511A and the second area 511B is in the ratio of 20:80. In other words, in this example, the consumable replacement threshold is expressed by the width of the first area 511A.

A middle graph display field 511 corresponds to the mobile printer 210. In this case, since 30% is set as the consumable replacement threshold, the width of the first area 511A and the second area 511B is in the ratio of 30:70. In other words, in this example, the consumable replacement threshold is expressed by the width of the first area 511A. A lower graph display field 511 is a display area corresponding to the MFP 200 in the same way as the uppermost graph display field 511.

Each of the four bar graphs decreases in conjunction with the actual remaining amounts of the consumables. When the remaining amount is below the consumable replacement threshold, the bar graph is shortened to an extent that a right end of the bar graph is located within the first area 511A, as a lowermost bar graph of the four bar graphs in the lower graph display field 511. Therefore, by looking at the relationship of the length of the bar graph with respect to the first area 511A (or the second area 511B), the user can very easily grasp which color of toner or ink has fallen below the consumable replacement threshold and how much the toner or ink has fallen below the consumable replacement threshold.

In the upper graph display field 511, each of the four bar graphs is broken off in the first area 511A. The part to the left of the break 513 represents the amount of ink remaining in a sub-tank, and the part to the right of the break 513 represents the amount of ink remaining in the ink cartridge. Therefore, the user can grasp the timing when the ink in the ink cartridge is completely gone and the ink in the sub-tank is still remaining by the display of the graph display field 511, and can perform the replacement of the ink cartridge at an appropriate timing.

Setting of Threshold Values

When a particular user operation is performed while executing the management process on the PC 100, the display 120 of the PC 100 displays a setting dialog 521 as shown in FIG. 5. As setting items according to the present disclosures, the setting dialog 521 includes an "Auto" button 523, a "Number of days for delivery" input field 525, a "Manual" button 527, a "Mobile" input field 529, and a "Stationary" input field 531.

The "Auto" button 523 and the "Manual" button 527 are so-called radio buttons, and selecting one of them deselects the other. The "Number of days for delivery" input field 525 is an input field that is validated when the "Auto" button 523 is selected. The "Mobile" input field 529 and the "Stationary" input field 531 are input fields that are validated when the "Manual" button 527 is selected.

When the "Auto" button is selected, the consumable replacement threshold is automatically set based on the usage history of the consumables in the managed device. More concretely, when the "Auto" button 523 is selected, the day when the consumables will run out is estimated based on the usage history of the consumables in the managed device, the consumable replacement threshold is calculated such that the user is notified a few days before the estimated day and set. To determine how many days in advance the user should be notified, the user enters a desired number of days in the "Number of days for delivery" input field 525.

For example, to ensure that the notification to the user is made at least three days in advance, the user enters "3" in the "Number of days for delivery" input field 525. With the input as in this example, the PC 100 calculates the consumable replacement threshold in the following manner.

Figure 6:
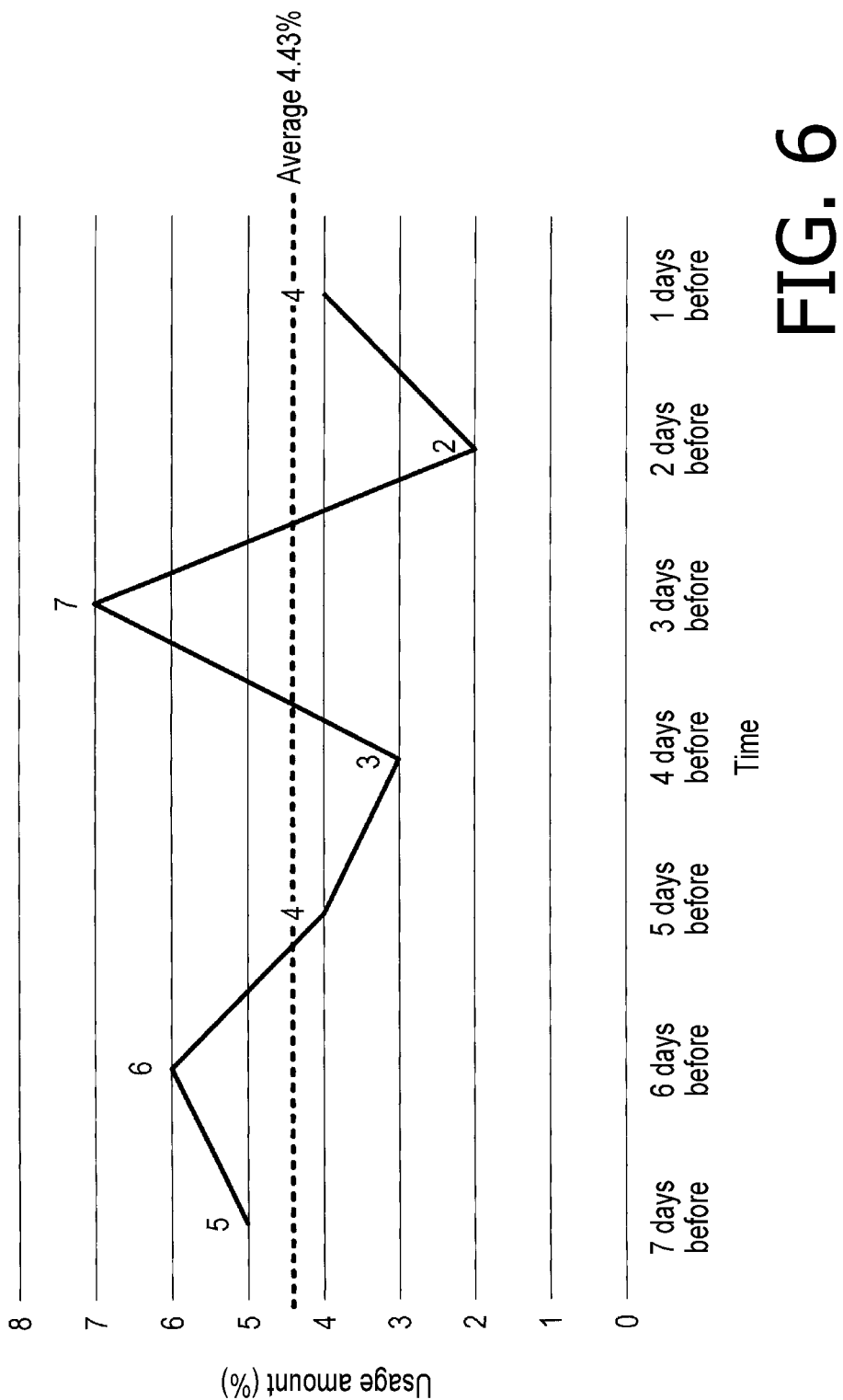
FIG. 6 is a graph showing an example of a usage history of the consumables.

First, the PC 100 obtains the usage history of the consumables in a target managed device from the DB 400. If the obtained usage history of consumables is fluctuating as shown in FIG. 6, for example, an average consumption of consumables in the past 7 days is (5+6+4+3+7+2+4)/7≈4.43%. Therefore, when the remaining amount of the consumables becomes 4.43%×3=13.29%, it is estimated that, on average, the consumables will run out in 3 days. Therefore, if the notification is made when the remaining amount of the consumables reaches 13.29%, the user will be notified three days before the day when the consumables are expected to run out. Therefore, in the case of MFP 200, a threshold value of 13.29% (which is an example of the second threshold value), which is equivalent to three days before the consumables run out, is set as the consumable replacement threshold.

On the other hand, in the case of the mobile printer 210, the consumable replacement threshold is set to 4.43%×(3+2)=22.15% (which is an example of the first threshold), which is the threshold equivalent to five days before the consumables run out. Thus, just by the user entering "3" in the "Number of days required for delivery" input field 525, a different threshold value is set for the MFP 200 and the mobile printer 210, which causes the notification to be made earlier in the case of the mobile printer 210 than in the case of the MFP 200. This example shows that the notification is executed two days earlier in the case of the mobile printer 210 than in the case of the MFP 200. It is noted that the two days is only an example and may be other than two days. In addition, it is not necessarily be limited to settings in units of days, but may also be configured to allow settings in units of hours.

When the "Manual" button 527 is selected, the user can designate the consumable replacement threshold by entering numerical values in the "Mobile" input field 529 and the "Stationary" input field 531. The consumable replacement threshold designated in the "Mobile" input field is reflected for all the mobile devices (e.g., the mobile printer 210) under the management of the PC 100. The consumable replacement threshold designated in the "Stationary" input field 531 is reflected for all the stationary devices (e.g., the MFP 200.) under the management of PC 100. Therefore, the user can implement batch settings for the multiple mobile devices and batch settings for the multiple stationary devices by operating on the setting dialog 521. According to the above configuration, unlike the case where the consumable replacement threshold is set for each managed device individually, the user does not have to repeat the work of setting the appropriate consumable replacement threshold while judging whether each managed device is a mobile device or a stationary device, thereby improving the work efficiency of the setting work.

Notification Settings

Figure 7:
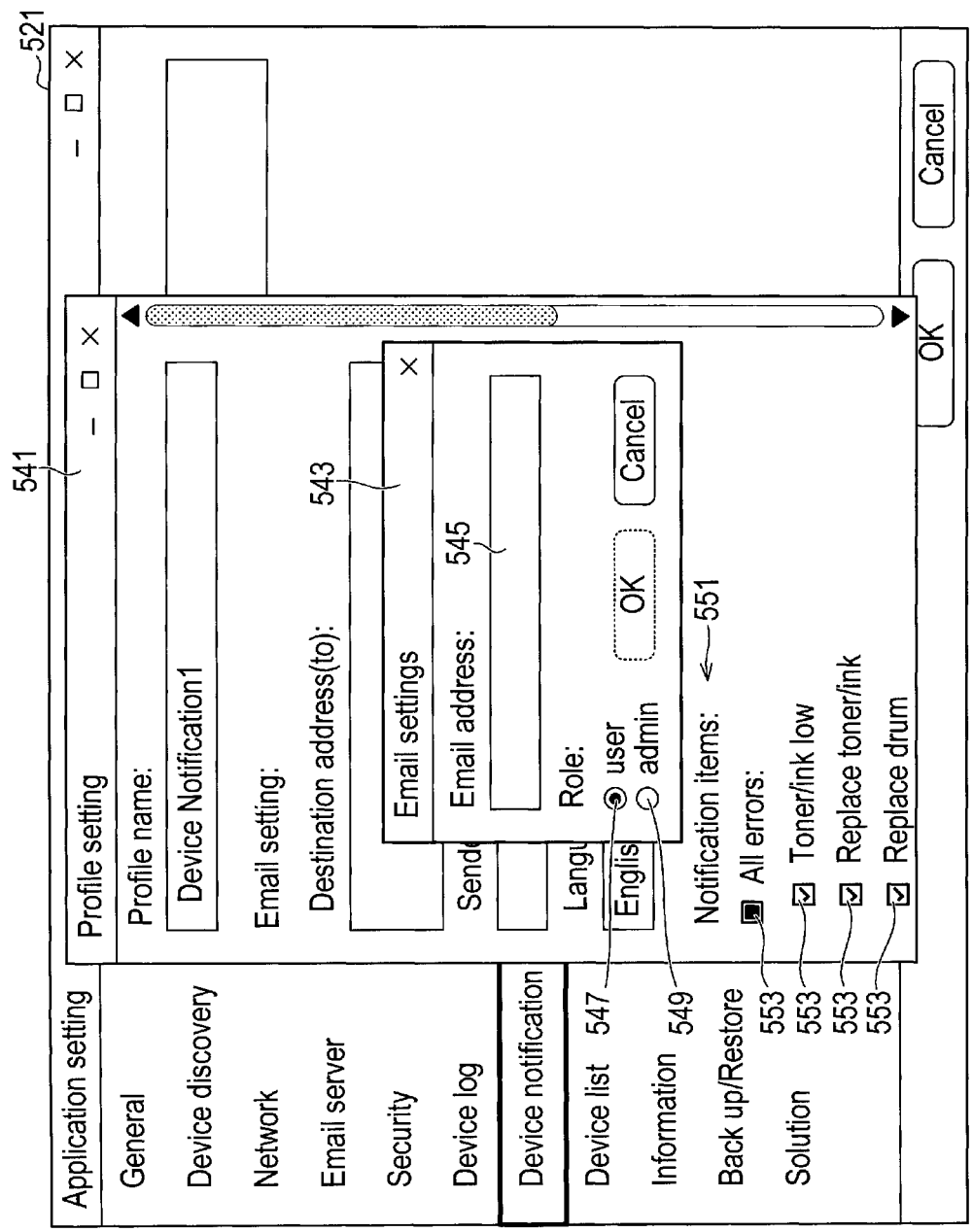
FIG. 7 shows an example of a notification setting dialog and an e-mail setting dialog.

When a particular user operation is performed while the management process is executed on the PC 100, a notification setting dialog 541 as shown in FIG. 7 is displayed on the display 120 of the PC 100. In addition, when a particular user operation is performed on the notification setting dialog 541, an e-mail setting dialog 543 as shown in FIG. 7 is displayed on the display 120 of the PC 100. The e-mail setting dialog 543 includes an "Email address" input field 545, a "user" button 547, and an "admin" button 549. The "user" button 547 and the "admin" button 549 are so-called radio buttons, and selecting one of them deselects the other.

The user can receive the above-mentioned notification in the form of an e-mail. When the user wishes to receive the notification, the user enters the e-mail address to receive the notification in the "Email address" input field 545. When the user wishes to receive notifications for general users, the user selects the "user" button 547. When the user wishes to receive notifications for the administrator, a user selects the "admin" button 549. If the above procedure for registering e-mail addresses is performed multiple times, multiple e-mail addresses can be registered in sequence. In that case, for each e-mail address, the user can set whether the user wishes to receive notifications for general users or the administrator.

Items included in each notification are different between notifications for general users and notifications for the administrator. Concretely, there are items that are notified to both general users and administrator, items that are notified to general users only, and items that are notified to the administrator only. Such items are listed in a "Notification items" field 551 of the notification setting dialog 541. The user can receive desired notifications related to the listed items by checking checkboxes 553 corresponding to the desired items.

To each item listed in the "Notification items" field 551, a predefined attribute is assigned. The attribute indicates whether the item is notified to both general users and administrators, to general users only, or to the administrator only. Therefore, for example, when a check is placed in the checkbox 553 corresponding to an item to be notified only to the general users, a notification including that item will be sent to the e-mail address set as the destination of the notification for general users. When a check is placed in the checkbox 553 corresponding to an item that is notified only to the administrator, the notification including that item will be sent to the e-mail address set as the destination of the notification for the administrator. When a check is placed in the check box 553 corresponding to an item that is notified to both the general users and the administrator, the notification including the item is sent to both the e-mail address set as the destination for notifications for the general users and the e-mail address set as the destination for notifications for the administrator.

Manual Threshold Setting Process

Figure 8:
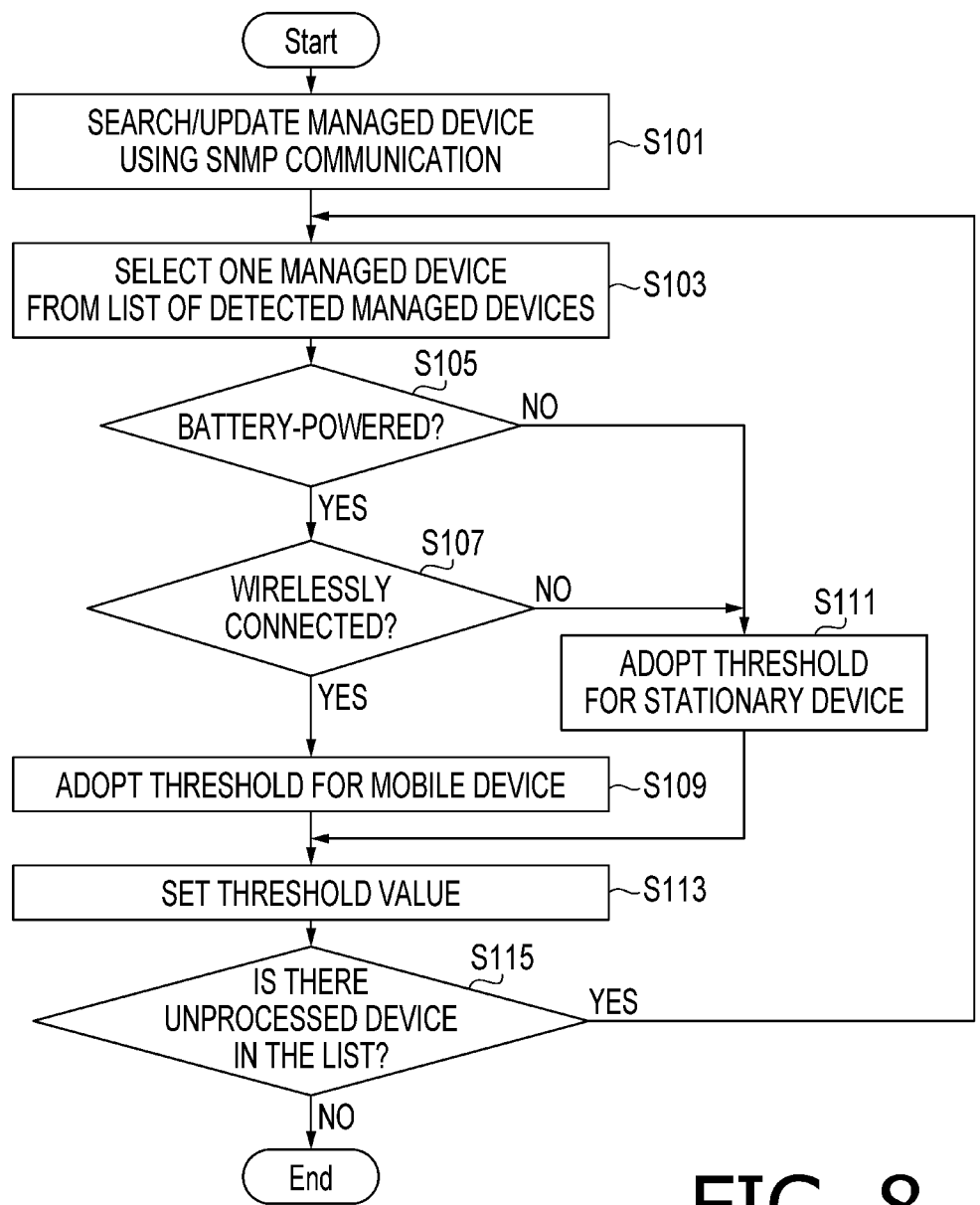
FIG. 8 is a flowchart illustrating a manual threshold setting process.

Next, a manual threshold setting process performed by the PC 100 will be explained referring to FIG. 8. When the manual threshold setting process shown in FIG. 8 is started, the PC 100 searches for/updates the managed devices by means of SNMP communication (S101). The term "SNMP" is an abbreviation for Simple Network Management Protocol.

In S101, the PC 100 uses the SNMP to request devices, which are communicable via the communication network 300, to provide information in a management information base (MIB) that is managed within each device. From the devices which are responsive to the request, particular information is transmitted. Therefore, the PC 100 that receives the information identifies the device to be managed (i.e., the managed device) based on the received information, and generates a list of the identified managed devices. It is noted that the received information includes information on whether the device is battery-powered or not, and whether the device has a wireless connection function or not.

Next, in S101, the PC 100 selects one managed device subjected to be processed (hereinafter, referred to as a target device) from the list of the managed devices detected (S103). Then, the PC 100 determines whether the target device is battery-powered (S105). When it is determined that the target device is battery-powered (S105: YES), the PC 100 further determines whether the target device has a wireless connection function (S107).

When it is determined that the target device has the wireless connection function (S107: YES), the PC 100 adopts the threshold value for the mobile device (S109). In S109, the value entered in the "Mobile" input field 529 is adopted. After completing S109, the PC 100 proceeds to S113. On the other hand, when it is determined that the target device is not battery-powered (S105: NO), and if it is determined that the target device is not a device having the wireless connection function (S107: NO), the PC 100 adopts the threshold value for stationary devices (S111). In S111, the value entered in the "Stationary" input field 531 is adopted. After completing S111, the PC 100 proceeds to S113.

According to the present embodiment, whether the target device is the mobile device or the stationary device is determined in S105 and S107. It is noted, however, a method for determining whether the target device is the mobile device or the stationary device should not be limited to a method equivalent to S105 and S107 above. For example, as an alternative, the model number or the device name of the target device may be used as a key to search the DB 400, and whether the device type corresponding to the model number is the mobile type or the stationary type may be obtained from the DB 400. Alternatively, if the model number or the serial number of the target device contains a character string or a numeric string indicating the device type, it may be determined whether the device type is the mobile type or the stationary type based on such a character string or a numeric string.

Proceeding from S109 or S111 to S113, the PC 100 sets a threshold value (S113). In S113, the value adopted in S109 or S111 is set as the threshold value to be used in the subsequent processes. Accordingly, if the threshold value set in S113 is used, for example, when the target device is the mobile device (e.g., the mobile printer 210.), the value entered in the "Mobile" input field 529 will be used as the threshold value. On the other hand, when the target device is the stationary device (e.g., the MFP 200.), the value entered in the "Stationary" input field 531 will be used as the threshold value.

Next, the PC 100 determines whether or not there is an unprocessed target device in the list (S115). When it is determined that there is an unprocessed target device in the list (S115: YES), the PC 100 returns to S103. Accordingly, when there are unprocessed target devices, S103-S115 are repeatedly executed. When it is determined that there is no unprocessed target device in the list (S115: NO), the manual threshold setting process shown in FIG. 8 is terminated.

Auto Threshold Setting Process

Figure 9:
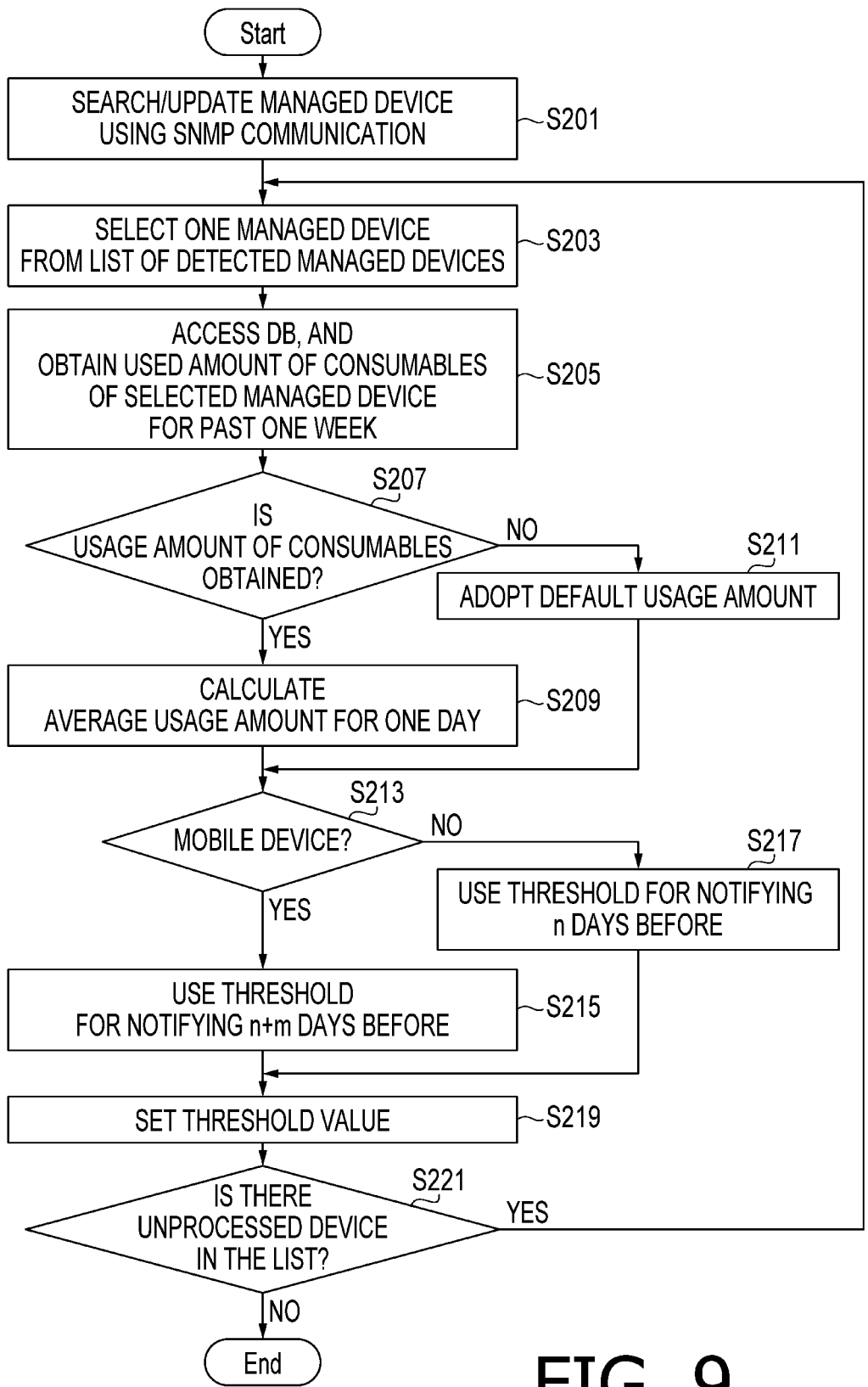
FIG. 9 is a flowchart illustrating an auto threshold setting process.

Next, an auto threshold setting process performed by the PC 100 will be described based on FIG. 9. When the auto threshold setting process shown in FIG. 9 is started, the PC 100 searches for or updates the managed device via the SNMP communication (S201). Since S201 is equivalent to S101 described above, explanation of the S201 here is omitted. Next, the PC 100 selects one managed device from the list of the managed devices which are detected in S201 (S203).

The PC 100 then accesses the DB 400 and obtains the usage amount of the consumables of the selected managed device for the past one week (S205). The usage amount of the consumables obtained in S205 is data to be obtained for performing calculations as described in the "Threshold Setting" section above, and explanation of the calculations will be described later. In S205, it is unclear whether or not the usage amount of the consumables for the past one week can always be acquired. For example, when the managed device has been in use for less than one week, the usage amount of the consumables for the past one week cannot be obtained. Even when the managed device has been in use for more than one week, the information recorded in the DB 400 might be initialized for some reason. In such a case, the usage amount of the consumables for the past one week might not be obtained, either.

Therefore, in S207, it is determined whether the usage amount of the consumables was obtained. When it is determined that the usage amount of the consumables was obtained (S207: YES), the PC 100 calculates an average daily usage amount (S209). In S209, the average daily usage is calculated by the calculation as described in the "Threshold Setting" section above.

It is noted that the value calculated here can be any value that reflects the amount of the consumables used in the managed device, and the average daily usage amount is an example of such a value. That is, instead of the average daily usage amount, the calculated value may be, for example, the maximum daily usage amount within the past one week. Alternatively, the calculated value may be an intermediate value between the maximum daily usage amount and the average daily usage amount, or a value obtained by multiplying the average daily usage by a particular coefficient (for example, a coefficient of 1.2 for a 20% increase).

On the other hand, when it is determined that the usage amount of the consumables could not be obtained (S207: NO), the PC 100 adopts a default usage amount (S211). The default usage amount is a particular value (e.g., 20%, etc.) which is determined in advance. Alternatively, the default value may be arbitrarily and variably set by the user, or a value entered in a "Stationary" input field 531 may be used.

Next, the PC 100 determines whether or not the managed device is the mobile device (S213). A determination method in S213 is arbitrary, but for example, a method equivalent to S105 and S107 described above may be adopted. Alternatively, the alternatives mentioned after describing S105 and S107 above may be adopted. When it is determined that the managed device is the mobile device (S213: YES), the PC 100 adopts a threshold for notification of n+m days in advance (S215). The numerical values n and m are n=3 and m=2 in the example described in the "Threshold Setting" section above. In other words, the numerical value n is the value entered in the "Number of days for delivery" input field 525, and the numerical value m, according to the embodiment, is a particular value "2." It is noted that m=2 is only an example, as explained in the [Threshold Setting] section above. On the other hand, when it is determined that the managed device is not the mobile device (S213: NO), the PC 100 adopts the threshold to be notified n days in advance (S217).

Proceeding from S215 or S217 to S219, the PC 100 sets the threshold value (S219). In S219, the value adopted in S215 or S217 is set as the threshold value to be used in the subsequent processing. This means that if the threshold value set in S219 is used, for example, if the target device is a mobile device (e.g., the mobile printer 210.), the threshold value for executing the notification n+m days in advance will be used as the threshold value. When the target device is the stationary device (e.g., the MFP 200), the threshold value for executing the notification n days in advance will be used as the threshold value.

Next, the PC 100 determines whether or not there is an unprocessed target device in the list (S221). When it is determined that there is an unprocessed target device in the list (S221: YES), the PC 100 returns to S203. When it is determined that there is no unprocessed target device in the list (S221: NO), the auto threshold setting process shown in FIG. 9 is terminated.

Notifying Process

Figure 10:
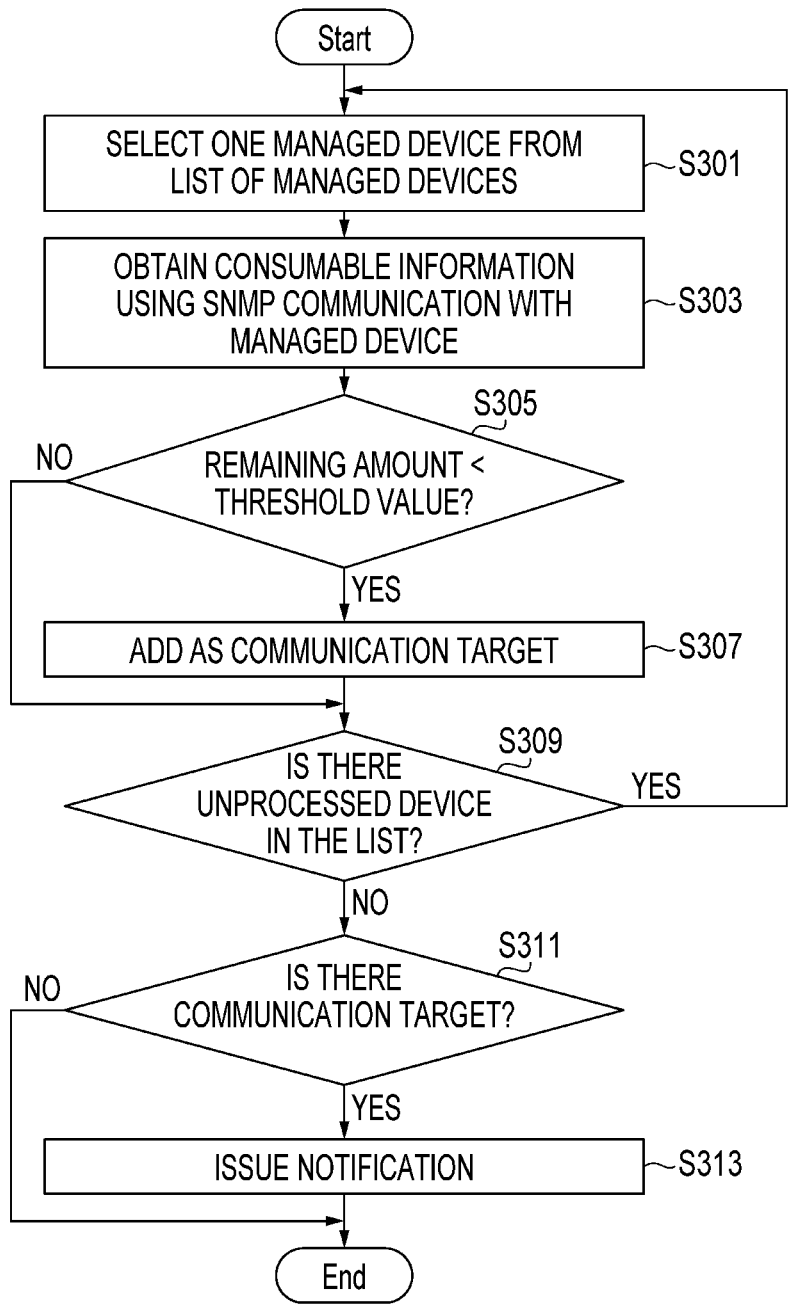
FIG. 10 is a flowchart illustrating a notifying process.

Next, the notifying process performed by the PC 100 will be described with reference to FIG. 10. When the notifying process shown in FIG. 10 is started, the PC 100 selects one of the managed devices from the list of managed devices (S301). Then, the PC 100 obtains the consumable information through the SNMP communication with the managed device (S303). The PC 100 then determines whether the remaining amount of the consumables in the managed device is less than a threshold value (S305).

When it is determined that the remaining amount of the consumables is less than the threshold value (S305: YES), the PC 100 adds the managed device as a notification target (S307). After completing S307, the PC 100 proceed to S309. On the other hand, when it is determined that the remaining amount of the consumables is not less than the threshold value (i.e., the remaining amount of the consumables is equal to or greater than the threshold value) (S305: NO), the PC 100 does not execute S307 and proceeds to S309.

When proceeding from S305 or S307 to S309, the PC 100 determines whether or not there is an unprocessed target device in the list (S309). When it is determined that there is an unprocessed target device in the list (S309: YES), the PC 100 returns to S301. Then, when there is an unprocessed target device in the list, steps S301-S309 are repeatedly executed. When it is determined that there is no unprocessed target device in the list in S309 (S309: NO), the PC 100 determines whether or not there is a notification target (S311). It is noted that the notification target subjected to the determination in S311 is the notification target added in S307.

When it is determined that there is the notification target (S311: YES), the PC 100 issues a notification (S313). The notification issued in S313 is an e-mail notification as described in the "Notification Setting" section above. After completing S311, the notifying process shown in FIG. 10 is terminated. When it is determined that there is no notification target (S311: NO), the notifying process shown in FIG. 10 is terminated. It is determined that there is no notification target in S311 when S307 has not been executed even once. This corresponds to a case where all the remaining amounts of the consumables in one or more of the managed devices are equal to or greater than the threshold value.

Effect

As described above, according to the PC 100, depending on whether the managed device (e.g., the MFP 200 and the mobile printer 210) is the mobile device or the stationary type device, different threshold values are used in S113 and in S219 (which corresponds to an example of determining whether the remaining amount of the consumable identified based on the remaining amount information is equal to or less than the threshold value, according to the present disclosure). Therefore, when the managed device is the mobile device, the notification is issued earlier than when the managed device is the stationary device.

Therefore, users of the mobile devices can prepare spare consumables in plenty of time if notifications are received, and can take measures such as going to destinations with spare consumables. In addition, users of the stationary devices will not be bothered by such early notifications because the notifications can be prevented from being issued too early. Therefore, users of both the mobile and stationary devices can receive the notifications at an appropriate timing.

In addition, according to the present embodiment, S105 and S107 (which correspond to an example of determining whether the managed device is a mobile device or a stationary device, according to the present disclosures), it can be determined whether the managed device is the mobile device or the stationary device based on whether the mobile device is a battery-powered device or not, and whether the managed device is a wirelessly connectable device or not.

In addition, according to the present embodiment, in a process of S213 to S217 (which is an example of the setting according to the present disclosures), the average consumption amount of the consumables in a unit period (e.g., one day.) is calculated, and a value obtained by multiplying the average consumption amount by the first coefficient n (e.g., n=3.) is set as the first threshold, and a value obtained by multiplying the average consumption amount by the second coefficient n+m (e.g., n=3, m=2, n+m=5) is set as the second threshold. Therefore, the threshold value set in the setting process is larger than in a case of the stationary device, and the notification can be executed earlier in the case of the mobile device.

According to the present embodiment, as shown in FIG. 3, the PC 100 displays the management screen 501 on the display 120, and in the information table 503 thereof, the consumable replacement threshold (i.e., the threshold object) is displayed as one of the display objects is displayed. Thus, the user can grasp the threshold set in S113 or S219 by looking at the management screen 501.

displaying device According to the present embodiment, as shown in FIG. 4, the PC 100 displays bar graphs showing the remaining amount of the consumables (i.e., the remaining amount objects) as one of the display objects. The bar graphs are displayed in a manner that allows the user to identify whether or not the remaining amount has fallen below a threshold value (i.e., whether or not the right end of the bar graph is on the side of the first area 511A). Therefore, the user can identify whether or not the remaining amount has fallen below the threshold by looking at the management screen 501.

Further, according to the present embodiment, the notifications are sent according to the settings described in the "Notification Settings" section above in the notifying process shown in FIG. 10. Therefore, necessary notifications are sent to both general users and administrators, while unnecessary notifications can be prevented from being sent.

Other Embodiments

The management program, the information processing device, and the information processing method above are described based on the illustrative embodiment. It is noted, however, the present disclosures should not be limited to the above-described illustrative embodiment, but can be implemented in various forms within the scope not deviating from the technical concept of the present disclosures.

For example, in the above embodiment, the MFP 200 and the mobile printer 210 are illustrated as examples of the managed device, but the managed device should not be limited to the MFP 200 or the mobile printer 210. As the managed device, various devices configured to allow attachment of optional items can be assumed. Examples of such a managed device include a variety of network devices, for example, printing devices such as printers, facsimile machines, and MFPs, image input devices such as scanners, network cameras, and MFPs, image communication devices such as facsimile machines and MFPs, communication devices such as smartphones, tablet terminals, cell phones, and network routers, information server devices such as network storage, cutting plotters (cutting machines) and the like. Further, the managed devices may be home appliances equipped configured to communicate via a network (so-called network home appliances) which include, for example, sewing machines, VCRs, HDD/DVD recorders, home game machines, radios, washing machines, clothes dryers, microwave ovens, ovens, refrigerators, rice cookers, electric pots, dishwashers, dryers, air conditioners, heaters, dehumidifiers, humidifiers, air purifiers, lighting devices, toilet seats for washing, etc.

In the above embodiment, the DB 400 is a data storage area accessible via the communication network 300, but a part of or all of the storage area equivalent to the DB 400 may be configured as a storage area provided in the PC 100. In such a case, the PC 100 can access the storage area equivalent to the DB 400 not via (i.e., directly) the communication network 300. When the storage area equivalent to the DB 400 is provided in the PC 100, if a file server function is implemented to the PC 100, a device external to the PC 100 (e.g., the MFP 200 and the mobile printer 210) can access the storage area in the PC 100 via the communication network 300.

A plurality of functions realized by one component illustrated in the above embodiment may be realized by a plurality of components. A single function realized by one component illustrated in the above embodiment may be realized by multiple components. A plurality of functions realized by a plurality of components illustrated in the above embodiments may be realized by a single component. A single function realized by the plurality of components illustrated in the above embodiment may be realized by a single component. Some of the components illustrated in the above embodiments may be omitted. At least a part of the configuration illustrated in one of the above embodiments may be added to or replaced with the configuration illustrated in the above embodiments other than that one embodiment.

Supplementary

As is apparent from the illustrative embodiment described above, the management program, the information processing device, and the information processing method according to the present disclosures may further be equipped with the following configurations.

(A) The first determination process may be configured to determine, based on information obtained from the managed device, whether the managed device is the battery-powered device and whether the managed device is the wirelessly connectable device, and to determine that the managed device is the mobile device when it is determined to be the battery-powered device and the wirelessly connectable device, while to determine that the managed device is the stationary device when it is determined not to be the battery-powered device or the wirelessly connectable device.

By having the processor of the information processing device execute the management process with the management program configured in such a way, it is possible to determine whether the managed device is the mobile device or the stationary device based on whether the managed device is the battery-powered device or the wirelessly connectable device.

(B) The setting process may be configured to calculate an average consumption amount of the consumables in a unit period based on the consumption amount of the consumables consumed by the managed device in a processing period including a plurality of unit periods, and to set a value obtained by multiplying the average consumption amount by a first coefficient as the first threshold value and a value obtained by multiplying the average consumption by a second coefficient as the second threshold value. The first coefficient may be a value greater than the second coefficient.

By having the processor of the information processing device perform the management process with the management program configured in this way, the value obtained by multiplying the average consumption of consumables in the unit period by the first coefficient is set as the first threshold, and the value obtained by multiplying the same average consumption by the second coefficient is set as the second threshold. Since the first coefficient is set to be larger than the second coefficient, the first threshold is larger than the second threshold. Therefore, in the case of the mobile device, the threshold value set in the setting process is larger than in the case of the stationary device, and the notification can be issued earlier.

(C) The processor may be configured to cause the display to perform a display process for displaying, on the display, a management screen that includes the same number of display areas as the number of at least one managed device and in which at least one display object for the managed device associated with the display area is arranged in the display area. The display area may be configured such that, as one of the display objects, a threshold object indicating a threshold set in the setting process may be arranged.

By having the processor of the information processing device execute the management process with the management program configured in this way, the user can grasp the threshold values set in the setting process by looking at the management screen.

(D) A remaining amount object indicating the remaining amount of the consumables in the managed device may be arranged in the display area as one of the objects for display. The remaining amount object may be configured to be displayed in a manner that allows a user to identify whether the remaining amount has fallen below a threshold value.

By having the processor of the information processing device execute the management process with the management program configured in this way, the user can identify whether the remaining amount has fallen below the threshold level by looking at the management screen.

(E) The notifying process may be configured to transmit a plurality of consumable-related notifications, including notifications regarding the remaining amount of the consumables. Each of the plurality of consumable-related notifications may have a destination type that indicates whether the notification should be sent to general users and administrators. When any of the plurality of consumable-related notifications is sent in the notifying process, the destination type is selected from among general users and administrators based on the destination type set for the consumables-related notification to be sent. When sending any of the multiple consumables-related notifications in the notifying process, the system may be configured to send the consumable-related notification to one or both of the general users and the administrators, based on the destination type set for the consumable-related notification to be sent.

By having the processor of the information processing device execute the management process with the management program configured in this way, necessary notifications can be sent to general users and administrators, respectively, while unnecessary notifications can be prevented from being sent.

(F) An information processing device according to the present disclosures may have the configuration corresponding to items (A) to (E) above. Further, the information processing method according to the present disclosures may have the configuration corresponding to items (A) to (E) above.

What is claimed is:

1. A non-transitory computer-readable recording medium for an information processing device of an information processing system, the information processing system including the information processing device and at least one managed device managed by the information processing device, the information processing device including a processor, a display and a communication interface, the managed device including at least one type of consumables configured to be replaced or replenished, the information processing device being communicable with the managed device through the communication interface, the recording medium storing computer-executable instructions comprising a management program which causes, when executed by the processor, the information processing device to perform managing the consumables, the managing including:
determining whether the managed device is a mobile device or a stationary device;
setting:
 a first threshold value as a threshold value when it is determined that the managed device is the mobile device; and
 a second threshold value different from the first threshold value as the threshold value when it is determined that the managed device is the stationary device;
obtaining remaining amount information regarding a remaining amount of the consumable currently used in the managed device from the managed device through the communication interface;
determining whether the remaining amount of the consumable identified based on the remaining amount information is equal to or less than the threshold value; and
issuing a notification regarding the remaining amount of the consumable associated with the managed device when it is determined that the remaining amount of the consumable is equal to or less than the threshold value,
wherein the notification is issued earlier in a case where the threshold value is the first threshold value than in a case where the threshold value the second threshold value.

2. The non-transitory computer-readable recording medium according to claim 1,
wherein, based on the information obtained from the managed device, the processor is configured to:
 determine whether the managed device is a battery-powered device; and
 determine whether the managed device is a wirelessly connectable device, and
wherein:
 when the managed device is determined to be the battery-powered device and the wirelessly connectable device, the processor determines that the managed device is the mobile device; and when the managed device is determined not to be the battery-powered device or the wirelessly connectable device, the processor determines that the managed device is the stationary device.

3. The non-transitory computer-readable recording medium according to claim 1,
wherein, the processor is configured to:
calculate an average consumption amount of the consumable in a unit period based on a consumption amount of the consumables consumed by the managed device within a target process period including a plurality of unit periods;
set a value obtained by multiplying the average consumption amount by a first coefficient to the first threshold value; and
set a value obtained by multiplying the average consumption amount by a second coefficient to the second threshold value, and
wherein the first coefficient is greater than the second coefficient.

4. The non-transitory computer-readable recording medium according to claim 1,
wherein the management program further causes, when executed, the processor to perform displaying a management screen on the display,
wherein the management screen includes at least one display area of which number is same as a number of at least one managed device, at least one display object being arranged on each of the at least one display areas, the at least one display object displayed on each of the at least one display areas being related to the managed device associated with each of the display areas, and
wherein a threshold object indicating the threshold value is displayed as one of the display objects displayed on each of the display areas.

5. The non-transitory computer-readable recording medium according to claim 4,
wherein a remaining amount object indicating a remaining amount of the consumable in the managed device is displayed in the display area as one of the display objects, and
wherein the remaining amount object is configured to be displayed in a manner that makes a user recognize whether the remaining amount is lower than the threshold value.

6. The non-transitory computer-readable recording medium according to claim 1,
wherein the processor, when managing the consumable, is configured to transmit consumable-related notifications regarding a plurality of items of notifications including the notification of the remaining amount of the consumable,
wherein a destination type is set to each of the plurality of items of the notifications, the destination type indicating whether the notification is to be sent to a general user or an administrator, and
wherein, when any of the plurality of items of the consumable-related notifications is to be transmitted in the issuing the processor transmits the consumable-related notification to one of or both of the general user and the administrator selected based on the notification types set to the consumable-related notifications subjected to transmission.

7. An information processing device of an information processing system, the information processing system including the information processing device and at least one managed device managed by the information processing device, the information processing device including a processor, a display and a communication interface, the managed device including at least one type of consumables configured to be replaced or replenished, the information processing device being communicable with the managed device through the communication interface, the information processing device is configured to perform managing the consumables,
the processor being configured to perform:
determining whether the managed device is a mobile device or a stationary device;
setting:
a first threshold value as a threshold value when it is determined that the managed device is the mobile device; and
a second threshold value different from the first threshold value as the threshold value when it is determined that the managed device is the stationary device;
obtaining remaining amount information regarding a remaining amount of the consumable currently used in the managed device from the managed device through the communication interface;
determining whether the remaining amount of the consumable identified based on the remaining amount information is equal to or less than the threshold value; and
issuing a notification regarding the remaining amount of the consumable associated with the managed device when it is determined that the remaining amount of the consumable is equal to or less than the threshold value,
wherein the notification is issued earlier in a case where the threshold value is the first threshold value than in a case where the threshold value the second threshold value.

8. The information processing device according to claim 7,
wherein, based on the information obtained from the managed device, the processor is configured to:
determine whether the managed device is a battery-powered device; and
determine whether the managed device is a wirelessly connectable device, and
wherein:
when the managed device is determined to be the battery-powered device and the wirelessly connectable device, the processor determines that the managed device is the mobile device; and
when the managed device is determined not to be the battery-powered device or the wirelessly connectable device, the processor determines that the managed device is the stationary device.

9. The information processing device according to claim 7,
wherein, the processor is configured to:
calculate an average consumption amount of the consumable in a unit period based on a consumption amount of the consumables consumed by the managed device within a target process period including a plurality of unit periods;
set a value obtained by multiplying the average consumption amount by a first coefficient to the first threshold value; and
set a value obtained by multiplying the average consumption amount by a second coefficient to the second threshold value, and wherein the first coefficient is greater than the second coefficient.

10. The information processing device according to claim 7,
wherein the processor is configured to display a management screen on the display,
wherein the management screen includes at least one display area of which number is same as a number of at least one managed device, at least one display object being arranged on each of the at least one display areas, the at least one display object displayed on each of the at least one display areas being related to the managed device associated with each of the display areas, and
wherein a threshold object indicating the threshold value is displayed as one of the display objects displayed on each of the display areas.

11. The information processing device according to claim 10,
wherein a remaining amount object indicating a remaining amount of the consumable in the managed device is displayed in the display area as one of the display objects, and
wherein the remaining amount object is configured to be displayed in a manner that makes a user recognize whether the remaining amount is lower than the threshold value.

12. The information processing device according to claim 7,
wherein the processor, when managing the consumable, is configured to transmit consumable-related notifications regarding a plurality of items of notifications including the notification of the remaining amount of the consumable,
wherein a destination type is set to each of the plurality of items of the notifications, the destination type indicating whether the notification is to be sent to a general user or an administrator, and
wherein, when any of the plurality of items of the consumable-related notifications is to be transmitted in the issuing the processor transmits the consumable-related notification to one of or both of the general user and the administrator selected based on the notification types set to the consumable-related notifications subjected to transmission.

13. An information processing method for an information processing device of an information processing system, the information processing system including the information processing device and at least one managed device managed by the information processing device, the information processing device including a display and a communication interface, the managed device including at least one type of consumables configured to be replaced or replenished, the information processing device being communicable with the managed device through the communication interface, the information processing device is configured to perform managing the consumables,
the method including:
determining whether the managed device is a mobile device or a stationary device;
setting:
a first threshold value as a threshold value when it is determined that the managed device is the mobile device; and
a second threshold value different from the first threshold value as the threshold value when it is determined that the managed device is the stationary device;

obtaining remaining amount information regarding a remaining amount of the consumable currently used in the managed device from the managed device through the communication interface;
determining whether the remaining amount of the consumable identified based on the remaining amount information is equal to or less than the threshold value; and
issuing a notification regarding the remaining amount of the consumable associated with the managed device when it is determined that the remaining amount of the consumable is equal to or less than the threshold value,
wherein the notification is issued earlier in a case where the threshold value is the first threshold value than in a case where the threshold value the second threshold value.

14. The information processing method according to claim 13, further including, based on the information obtained from the managed device, the processor is configured to:
determining whether the managed device is a battery-powered device;
determining whether the managed device is a wirelessly connectable device;
determining that the managed device is the mobile device when the managed device is determined to be the battery-powered device and the wirelessly connectable device; and
determining that the managed device is the stationary device when the managed device is determined not to be the battery-powered device or the wirelessly connectable device.

15. The information processing method according to claim 13, further including:
calculating an average consumption amount of the consumable in a unit period based on a consumption amount of the consumables consumed by the managed device within a target process period including a plurality of unit periods;
setting a value obtained by multiplying the average consumption amount by a first coefficient to the first threshold value; and
setting a value obtained by multiplying the average consumption amount by a second coefficient to the second threshold value, and
wherein the first coefficient is greater than the second coefficient.

16. The information processing method according to claim 13, further including displaying a management screen on the display,
wherein the management screen includes at least one display area of which number is same as a number of at least one managed device, at least one display object being arranged on each of the at least one display areas, the at least one display object displayed on each of the at least one display areas being related to the managed device associated with each of the display areas, and
wherein a threshold object indicating the threshold value is displayed as one of the display objects displayed on each of the display areas.

17. The information processing method according to claim 16,
wherein a remaining amount object indicating a remaining amount of the consumable in the managed device is displayed in the display area as one of the display objects, and wherein the remaining amount object is configured to be displayed in a manner that makes a user recognize whether the remaining amount is lower than the threshold value.

18. The information processing method according to claim 13,
wherein the processor, when managing the consumable, is configured to transmit consumable-related notifications regarding a plurality of items of notifications including the notification of the remaining amount of the consumable,
wherein a destination type is set to each of the plurality of items of the notifications, the destination type indicating whether the notification is to be sent to a general user or an administrator, and
wherein, when any of the plurality of items of the consumable-related notifications is to be transmitted in the issuing the processor transmits the consumable-related notification to one of or both of the general user and the administrator selected based on the notification types set to the consumable-related notifications subjected to transmission.

* * * * *